(12) United States Patent
Yi

(10) Patent No.: US 8,470,437 B2
(45) Date of Patent: Jun. 25, 2013

(54) POROUS CEMENT ROAD SURFACE MADE FROM POLYMER MODIFIED CEMENT AND A CONSTRUCTION METHOD THEREOF

(76) Inventor: Zhijian Yi, Chongqing (CN)

( * ) Notice: Subject to any disclaimer, the term of this patent is extended or adjusted under 35 U.S.C. 154(b) by 82 days.

(21) Appl. No.: 12/430,714

(22) Filed: Apr. 27, 2009

(65) Prior Publication Data

US 2010/0112329 A1     May 6, 2010

Related U.S. Application Data

(63) Continuation of application No. PCT/CN2007/070996, filed on Oct. 31, 2007.

(30) Foreign Application Priority Data

Oct. 31, 2006    (CN) .......................... 2006 1 0054555

(51) Int. Cl.
    *B32B 9/04*        (2006.01)
    *E01C 3/00*        (2006.01)

(52) U.S. Cl.
    USPC .................. 428/318.4; 428/312.4; 404/31

(58) Field of Classification Search
    USPC .................. 428/312.4, 319.1, 317.9; 404/82, 404/31
    See application file for complete search history.

(56) References Cited

U.S. PATENT DOCUMENTS

| | | | |
|---|---|---|---|
| 4,614,755 A * | 9/1986 | Rodgers ............................ | 524/5 |
| 5,069,721 A * | 12/1991 | Tamura et al. ..................... | 524/5 |
| 5,788,407 A * | 8/1998 | Hwang ............................ | 404/81 |
| 2002/0152711 A1 * | 10/2002 | Schmitz ........................... | 52/612 |
| 2002/0198291 A1 * | 12/2002 | Frenkel ............................ | 524/2 |
| 2007/0223998 A1 | 9/2007 | Hartenburg | |

FOREIGN PATENT DOCUMENTS

| | | |
|---|---|---|
| CN | 1238724 A | 2/2001 |
| CN | 1310265 A | 8/2001 |
| CN | 1598151 A | 3/2005 |
| CN | 1851132 A | 10/2006 |

(Continued)

OTHER PUBLICATIONS

International Search Report and corresponding to International Patent Application No. PCT/CN2007/070996, mailed Feb. 14, 2008, 6 pages, includes both Chinese document and English translation.

(Continued)

*Primary Examiner* — Hai Vo

(74) *Attorney, Agent, or Firm* — Hanley, Flight & Zimmerman, LLC

(57) ABSTRACT

A porous concrete road surface structure made from polymer modified cement and a construction method thereof are disclosed. The structure successively comprises a bottom layer, a bonding layer, a porous concrete layer and a surface treatment layer. The bonding layer is located on the bottom layer, and the porous concrete layer on the bonding layer is prepared through paving, leveling and jolting a composition mixed from broken stone, sand and a slurry mixture of polymer modified cement. The addition of polymer promotes bonding of granular materials with the slurry mixture tightly, the use of the bonding layer makes the road surface structure and the bottom layer form an integral body, and the road surface structure has high strength, good crack resistance, water resistance, ageing resistance and corrosion resistance; the use of an intermittent or single graded of particles results in large pores, makes the road surface water-penetrating, decreases noise and amount of the polymer; and, the surface treatment can improve markedly surface properties and its use according to the application can make the porous concrete layer has rigid or flexible characteristic. The porous concrete road surface can be paved, leveled and jolted by paving machine or manual labor.

14 Claims, 1 Drawing Sheet

FOREIGN PATENT DOCUMENTS

| | | |
|---|---|---|
| CN | 100552136 | 10/2009 |
| CN | 100554584 | 10/2009 |
| CN | 1948622 | 4/2012 |
| WO | 2005075741 | 8/2005 |

OTHER PUBLICATIONS

Mehta et al., "Concrete: Microstructure, Properties, and Materials," McGraw-Hill Companies, 2006 (670 pages).

Yaman et al., "Active and Non-Active Porosity in Concrete, Part I: Experimental Evidence," Mar. 2002 (20 pages).

Hu et al., "Depercolation threshold of porosity in model cement: approach by morphological evolution during hydration," Elsevier, 2005 (7 pages).

\* cited by examiner

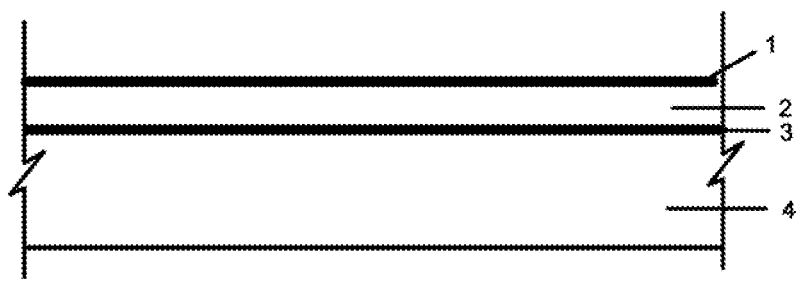

POROUS CEMENT ROAD SURFACE MADE FROM POLYMER MODIFIED CEMENT AND A CONSTRUCTION METHOD THEREOF

RELATED APPLICATION

This patent arises from a continuation of International Application Serial No. PCT/CN2007/070996, which was filed on Oct. 31, 2007, and which is hereby incorporated by reference in its entirety.

FIELD OF THE DISCLOSURE

The present disclosure relates to paving engineering including road engineering and so on and its construction method with special emphasis on the structure of porous concrete road surface made from polymer modified cement and its construction method thereof.

BACKGROUND

1. The Cement Concrete and Existent Polymer Modified Cement Concrete

Cement concrete is a commonly known and extensively applied construction material. However, because cement concrete material has its own unconquerable weaknesses such as large shrinkage in its early setting, initial inner defections, high brittleness and easy cracking. Modification of cement concrete has been under study and research for a long time.

Years ago a type of polymer modified cement concrete emerged. In the polymer modified cement concrete polymer or polymer emulsion is utilized to modify cement. Polymer cement grout (or slurry) or polymer emulsion cement grout is applied as a binder material to bond aggregates (such as broken stones) and sand together. Consequently the compressive strength, tensile strength and impact toughness of the polymer modified cement concrete are greatly improved with features of high corrosion resistance and outstanding flexibility. So it is applied extensively.

Currently polymer modified cement concrete is primarily applied as a material in mending work, decoration or house floor paving. In structure engineering polymer modified cement concrete is also accidentally applied to road pavement and bridge deck. Generally there are two construction technologies in polymer modified cement concrete work: I. If the aggregates in the concrete has relatively large particle sizes the similar construction technology with that for common cement concrete work is applied; The polymer modified cement concrete is required to have enough fluidity, a general slump range of 3-5 cm; After vibration to high density the polymer modified cement concrete is applied to floor with a paving thickness of 2-4 cm. II. If the aggregates in concrete has relatively small particle sizes greater fluidity of the polymer modified cement concrete is required (also known as polymer cement mortar) and brushing method is applied to spread the mortar onto the surface of a structure layer by layer with an overall thickness of 0.5-2 cm, such a construction method is generally suitable for mending and repairing and decorating.

In unit volume of the existent dense polymer modified cement concrete consumption quantity of polymer is rather large thus a very high construction cost is inevitable. In addition the thickness formed in one layer of brushing is rather small (no greater than 1 cm) and therefore the above second type of construction technology generally is labor-costly and not suitable for large-area construction or big-thickness paving (e.g. above 4 cm).

2. Road Paving and Other Paving Engineering

There are two primary types of pavement structures for highway, namely cement concrete pavement and asphalt concrete pavement. Cement concrete pavement is generally known as rigid pavement while asphalt concrete pavement is known as flexible pavement. The cement concrete pavement slab has greater rigidity, higher strength and larger elasticity modulus than those of the underlying base course and foundation. "Rigidity" is typical of the cement concrete pavement. The asphalt concrete pavement bears elasticity modus more nearer to that of the base course, and has a better flexibility and therefore is easier to adapt to the deformation of the base course and foundation. "Flexibility" is typical of the asphalt concrete pavement.

The cement concrete pavement involves in various types such as plain cement concrete pavement, reinforced concrete pavement, continuously reinforced concrete pavement, prestressed concrete pavement, prefabricated concrete pavement and steel fiber reinforced concrete pavement. Currently, cast-in-place plain cement concrete pavement is most extensively applied. The plain cement concrete pavement is of such advantages as convenient availability of source materials, simple construction method, high strength, sound stability and high durability. But it is also of such weaknesses as poor riding comfort, poor adaptability to base course deformation and easily damaged joints, it is hard to repair and restore after failure. In addition the plain cement concrete pavement slab needs a thickness generally over 20 cm.

The asphalt concrete pavement is formed through bonding the well graded aggregates by asphalt as a binder material. The asphalt pavement course may consist of one, two or three layers of asphalt concrete. In design of each layer of asphalt concrete factors of layer thickness, layer position, temperature, precipitation and traffic volume shall be considered. Though asphalt concrete pavement bears such advantages of even and smooth surface, no joint, comfortable riding, wearability, low vibration, low noise level and convenient maintenance, its construction procedure is relatively difficult and its water resistance, temperature resistance and aging resistance are poor, that may cause failure forms such as rutting, crumbling and reflective cracking, etc. Thickness needed for the asphalt concrete pavement is generally smaller than that for the plain cement concrete pavement.

3. Existent Problems

Dense concrete is required in existent common polymer modified cement concrete pavement, plain cement concrete pavement and rolled and compacted cement concrete pavement. Quality control of the pavement construction strictly rules out voids and pores in the concrete.

Dense concrete is also required in existent common asphalt concrete pavement. Failure forms such as rutting and cracking often occur due to low strength, poor aging resistance and high temperature sensibility of the dense asphalt concrete.

The special asphalt open grade friction concrete (OGFC) contains voids in interior and is of such features as water permeability and noise reduction. However, voids in the asphalt material as binding matrix bring much lower concrete strength than that of dense type asphalt concrete, thus structural damages occur more easily in OGFC pavement, and OGFC has not yet been widely applied to highway for heavy duty traffic.

SUMMARY OF THE DISCLOSURE

The following disclosure provides a simply structured and easily constructed porous concrete road surface structure made from polymer modified cement. The following disclosure also provides a construction method for formation of the porous concrete road surface structure.

In the following, an example porous concrete road surface structure is provided that includes a bottom layer, a bonding layer, a porous concrete layer and a surface treating layer. Onto the bottom layer top face sprays or brushes a bonding layer, and onto the bonding layer top face spreads a porous concrete layer, inside which the voids are almost evenly distributed. Finally onto the porous concrete layer sprays or brushes a coated surface treating layer.

In the present disclosure, on the one hand the inorganic bonding material of cement grout in common cement concrete is modified by polymer or polymer emulsion in order to enhance deformability of the resulted concrete; On the other hand the polymer modified cement with its excellent bonding ability bonds single graded or discontinuously graded coarse aggregates up with almost evenly distributed inner voids, in turn enabling formation of a new type of road surface structure, namely a porous concrete road surface structure made from polymer modified cement.

Furthermore, in the present disclosure the said road surface bears features of water permeability and noise reduction. Meanwhile, since in the present disclosure voids are formed in the porous concrete layer, consumption of polymer is reduced; besides, the following description will demonstrate that construction of the said road surface structure in the present disclosure is much simpler, and the construction cost can be saved in other aspects.

According to the present disclosure the porous concrete layer is made of discontinuously graded or single graded coarse aggregates with sand, cement, polymer and water, and the above ingredients mix and then bond together with proportions in part by weight:cement:coarse aggregates:sand:polymer:water=150~400:1200~2200:0~500:30~200:0~120. Because the coarse aggregates of the polymer modified porous cement concrete are discontinuously graded or single-graded, the porous concrete layer contains a relatively high void ratio which provides features of better water permeability and lower noise level of the road surface.

According to the present disclosure the bonding layer is grout of polymer modified cement, or grout of polymer modified cement-sand mixture with proportions in part by weight: polymer:water:cement:sand=1:0~5:1~15:0~5. The function of the bonding layer is to bond firmly the porous concrete layer with the bottom layer.

According to the present disclosure the coated surface treating layer is polymer modified cement grout, or grout of polymer modified cement-sand mixture with proportions in part by weight: polymer:water:cement:sand=1:0~4:0~12:0~10. The coated surface treating layer improves wearability and skidding resistance of the porous concrete road surface.

Relatively rigid or relatively flexible porous concrete road surface structures can be designed to meet various actual requirements by adjusting the component proportions.

According to the present disclosure particle size of aggregates equal to or greater than 2.5 mm is applied.

Profitably in the present disclosure the porous concrete layer has a void ratio of 3-30%.

Preferably in the present disclosure the porous concrete layer has a void ratio of 10-30%.

According to the present disclosure the polymer used in the porous concrete layer, bonding layer and coated surface treating layer of the porous concrete road surface is polymer resin or polymer rubber or mixture of polymer resin and polymer rubber.

In more detail, the polymer used in the porous concrete layer, bonding layer and coated surface treating layer of the example porous concrete road surface is polymer emulsion such as styrene butadiene rubber (SBR) emulsion, neoprene emulsion, acrylic acid emulsion, acrylate emulsion, styrene-acrylate emulsion, vinyl acetate-ethylene (VAE) emulsion or mixture of two or more of the above emulsions According to the present disclosure the bottom layer is cement stabilized base course, existent cement concrete pavement or asphalt concrete pavement, which as foundation carries and distributes the loads transferred from the surface course. The cement stabilized base course is cement stabilized coarse aggregates base course or cement stabilized gravel base course.

According to the present disclosure a construction method for the porous concrete road surface is also provided. The said construction method is stated as follows: the polymer modified cement-sand grout or polymer modified cement grout is made, then sprayed or brushed with machinery or by hand on to cleaned top face of the bottom layer to form the bonding layer. The bonding layer shall be finished within 72 hours prior to placement of the porous concrete layer. Mixing equipment is applied to produce the polymer modified porous cement concrete and the polymer modified porous cement concrete is spread and leveled by a paver or by hand to form the porous concrete layer with approximately evenly distributed voids. The porous concrete layer is then covered by a membrane and cured for 1-7 days. After completion of curing polymer modified cement-sand grout or polymer modified cement grout is made, then sprayed or brushed with machinery or by hand on to top face of the porous concrete layer to form the coated surface treating layer.

From above it is clear that the above described example construction method is simple and efficient.

Further, through optimization of components proportions, control over range of void ratio and choice of aggregates particle size for the said porous concrete road surface, the example road surface structure and its corresponding construction method can suit different environmental conditions and meet different service requirements.

According to the present disclosure the features and advantages of the said porous concrete road surface and its construction method can be demonstrated in the following comparative analysis.

According to the present disclosure the porous concrete made from polymer modified cement is different from the existent polymer modified cement concrete in nature and the difference is presented as follows:

1) Compared with the existent polymer modified cement concrete, in the present disclosure the polymer modified porous cement concrete adopts a different design theory of mixing proportions. In the mixing proportions design of the polymer modified porous cement concrete in the present disclosure, discontinuously graded or single-graded aggregate is adopted which endows the resulted concrete with rich voids, thus reduces polymer consumption evidently. Meanwhile the polymer modified porous cement concrete in the disclosure shall be kept in adequate viscosity during spreading and leveling operation with machinery or by hand. But the existent polymer modified cement concrete must be of considerable fluidity during construction to form dense concrete with few inner voids, thus needs much more consumption of polymer.

2) In the present disclosure the polymer modified porous cement concrete has a different strength mechanism from that of the existent polymer modified cement concrete. Strength of the said polymer modified porous cement concrete comes from cohesion of the polymer modified cement grout as well as friction among the aggregates.

But strength of the existent polymer modified cement concrete primarily comes from the bonding force of the polymer cement grout matrix, the friction among the aggregates is rather weak.

3) There are apparent differences between their construction technologies. For the said polymer modified porous cement concrete the main construction procedures include spreading, leveling and screeding tight with paving machine or by hand, thereafter no roller compaction or roller vibration compaction is needed. While in construction of the existent polymer modified cement concrete vibrators are adopted frequently to make the concrete dense.

The example porous concrete road surface made from polymer modified cement differs distinctly from the existent common cement concrete pavement, roller compacted cement concrete pavement, polymer modified cement concrete pavement and asphalt concrete pavement, that lies in:

1) Difference from the Existent Common Cement Concrete Pavement

Difference in strength theory: The strength of common cement concrete mainly comes from bonding force of cement mortar, while strength of the said polymer modified porous cement concrete comes from cohesion of the polymer modified cement grout as well as friction among the aggregates.

Difference in material ingredient: binder agent in the common cement concrete is inorganic material, while binder agent in the said polymer modified porous cement concrete contains certain amount of polymer.

Difference in construction technology: For the said polymer modified porous cement concrete the main construction procedures include spreading, leveling and screeding tight with paving machine or by hand. While in construction of the existent common cement concrete vibrators are adopted frequently to make the concrete dense.

Difference in pavement structural theory: In design of the common cement concrete pavement flexural stress at pavement slab bottom is the controlling index, while in design of the said porous concrete road surface, due to improved deformability through introduction of polymer, and due to application of the bonding layer integrating the porous concrete layer with the bottom layer, the pavement structural load-carrying mechanism essentially changes and the design is thus mainly controlled by deformation index.

2) Difference from the Existent Roller Compacted Cement Concrete Pavement

Difference in material ingredient: binder agent in the existent roller compacted cement concrete is inorganic material, while binder agent in the said polymer modified porous cement concrete contains certain amount of polymer.

Difference in concrete constitution: constitution of the existent roller compacted cement concrete belongs to a dense type, while the said polymer modified porous cement concrete, due to its discontinuously graded or single graded aggregates, contains rich inner voids and belongs to a porous type, and has functions of water permeability and noise reduction.

Difference in pavement mechanics: the existent roller compacted cement concrete pavement bears high rigidity, poor deformability and low cracking resistance; while the said porous concrete road surface has high flexibility, good deformability and sound cracking resistance.

Difference in pavement structural theory: design theory for the roller compacted cement concrete pavement is the same with that for the above common cement concrete pavement where the controlling index is flexural strength of the pavement slab, while for the said porous concrete road surface, design is mainly controlled by pavement deformation index.

3) Difference from the Existent Polymer Modified Cement Concrete Pavement

Difference in construction technology: in construction of the existent polymer modified cement concrete vibrators are adopted frequently to make the concrete dense; while for the said polymer modified porous cement concrete the main construction procedures include spreading, leveling and screeding tight with paving machine or by hand, thereafter no roller compaction or roller vibration compaction is needed. Therefore the said porous concrete road surface is more suitable for larger-scale construction and quicker construction.

Difference in pavement mechanics: the existent polymer modified cement concrete pavement has larger shrinkage and easy cracking; while the said porous concrete road surface contains rich voids which greatly reduce shrinkage after construction, and it has a better cracking resistance.

4) Difference from the Existent Asphalt Concrete Pavement

Difference in material ingredients: in the existent asphalt concrete the binder material is asphalt; while in the said porous concrete road surface the binder material is artificially compounded polymer modified cement.

Difference in pavement mechanics: in comparison with the existent asphalt concrete pavement, the said porous concrete road surface benefits from a much better binder material of polymer modified cement, so it bears such advantages of good integrity, high strength, thermal stability, water stability, aging resistance and wearability; Relatively rigid or relatively flexible porous concrete road surface structures can be designed to meet various actual requirements through adjusting the polymer types and mixing proportions.

In summary, the example porous concrete road surface structure is a brand new type of road surface structure essentially different from the various existent pavement structures. The example porous concrete road surface is of such advantages as high strength of cement concrete pavement, high flexibility of asphalt concrete pavement, good stability as well as sound cohesion. Therefore the example porous concrete road surface combines benefits of both cement concrete pavement and asphalt pavement while avoids their respective defects.

For the example porous concrete road surface the thickness of surface course can be greatly reduced in assurance of pavement performance and service level, bringing considerable cost-effectiveness. Construction method for the example porous concrete road surface is convenient and simple and therefore applicable.

BRIEF DESCRIPTION OF THE DRAWINGS

An example implementation is provided by combination of attached FIG. 1 and the accompanying text.

FIG. 1 is a cross-sectional view of the porous concrete road surface structure made from polymer modified cement in the present disclosure.

In FIG. 1, 1 refers to the surface treating layer, 2 refers to the porous concrete layer, 3 refers to the bonding layer, and 4 refers to the bottom layer.

DETAILED DESCRIPTION

According to FIG. 1 an example of carrying out the invention is conducted.

The example porous concrete road surface structure of FIG. 1 includes a bottom layer 4, a bonding layer 3, a porous concrete layer 2 and a surface treating layer 1. Among the above on the surface of the bottom layer 4 sets a bonding layer 3 and on top of the bonding layer 3 paves a porous concrete layer 2, and top face of the porous concrete layer 2 is sprayed or brushed a surface treating layer 1.

An example method is stated as follows:

Firstly, clean top face of the bottom layer 4 which is in form of existent common cement concrete pavement, then apply polymer cement grout onto top face of the existent common cement concrete pavement 4 to form the bonding layer 3. The said bonding layer 3 is made of a mixture with mixing proportions in part by weight: styrene butadiene rubber (SBR) polymer emulsion:water:Portland cement PO 42.5:sand=1:3:4:0. After 1 hour the said polymer modified porous cement concrete, which has been mixed up with mixing machinery to proper viscosity in mixing proportions in part by weight: Portland cement PO 42.5:coarse aggregates (single-graded, particle size is 5-10 mm): sand:acrylic acid polymer emulsion:water=300:1650:50:100:20, and transported to jobsite by dumper, is spread, leveled and screeded tight with paving machinery on to top face of the said bonding layer 3 to form the porous concrete layer 2 with approximately evenly distributed voids, where the paving machinery belongs to the same type of paver used for asphalt concrete pavement and no roller compaction or roller vibration compaction is needed. The porous concrete layer is then covered by a membrane and cured for 3 days. After curing up the porous concrete layer, polymer modified cement-sand grout, which has been mixed up in situ with mixing machinery or by hand in mixing proportions in part by weight: styrene-acrylic polymer emulsion:water:Portland cement PO 42.5:sand=1:2:4.5:0.2, is applied with machinery and by hand on to top face of the said porous concrete layer to form the surface treating layer 1. Through above mentioned procedures the said porous concrete road surface in the present example road surface is formed and its void ratio is approximately 18%.

The following is part of mechanical test slabs of the said porous concrete road surface.

The inventor has conducted tests on the slabs of the said porous concrete road surface in a testing trough in laboratory. The thickness of soil bed in the testing trough is 1 m and the bottom layer is made of cement stabilized graded aggregates. The bottom layer and soil bed were both densely compacted by roller, providing almost identical foundation conditions to those provided by actual road bed and bottom layer. The slab dimensions of the porous concrete road surface for tests are 800 mm×450 mm×40 mm.

In tests other two geometrically identical common cement concrete slabs also have been tested for comparison. The slabs of the said porous concrete road surface are made of different concrete mixtures with two plans of mixing proportions. Mixing proportions for one batch of test slabs are: cement:coarse aggregates:polymer emulsion:water=200:1200:30:30, while mixing proportions for the other batch of test slabs are: cement:coarse aggregates:polymer emulsion=200:1200:60. Due to relatively small test slab dimensions particle sizes of the aggregates for the test slabs is smaller than 5 mm. As a batch two slabs are constructed with one plan of mixing proportions, thus there are totally 4 polymer modified porous cement concrete slabs in tests.

The comparative common cement concrete slabs, after casting, vibrating to full density and surface leveling, were cured according to relative curing specifications. The polymer modified porous cement concrete test slabs were screeded tight, then covered by membrane and cured. After 7 days' curing, the slabs are loaded with a rigid force-transmitting beam with a rectangular bottom face of dimensions: 450 mm×100 mm, the loading beam is laid on the slab with bottom face lengthwise midline of the former coinciding with top face crosswise midline of the latter.

In loading process a strain gauge is adopted to collect tension strain at the slab bottom. The two common cement concrete pavement test slabs were separately loaded, average bottom-cracking load for them two was 3 tons. While for all the 4 test slabs of the disclosed porous concrete road surface when the load reached even 30 tons no cracking occurs. The measured strain results were well consistent with the observed phenomena.

It is observed in the tests that when polymer emulsion to cement weight ratio reached 30%, the rigid loading beam bottom face appeared to slightly intrude into the porous concrete road surface test slab top face, like what will be observed with rubber plate under localized compression. Such a phenomenon indicates that with a relatively high polymer emulsion to cement weight ratio the resulted porous concrete road surface test slabs bears considerable deformability.

Measured results of the given pavement test slabs are listed in table 1.

TABLE 1

Measured results of the Pavement Slabs

| Type of pavement test slab | | Load level (ton) | Observed pavement Slab state |
|---|---|---|---|
| The test batch of common cement concrete slabs | | 3 | cracking |
| Test batch 1 of the porous concrete road surface slabs | polymer emulsion to cement ratio: 15% | 30 | Without cracking |
| | polymer emulsion to cement ratio: 30% | 30 | Without cracking but with slight interfacial intrusion |
| Test batch 2 of the porous concrete road surface slabs | polymer emulsion to cement ratio: 15% | 30 | Without cracking |
| | polymer emulsion to cement ratio: 30% | 30 | Without cracking and appearance of slight lateral protruding |

It can be realized from above tests that the porous concrete road surface test slabs have much stable performance and load-carrying capacity, thus the porous concrete road surface is a type of pavement with excellent mechanical properties.

It is noted that this patent claims priority from Chinese Patent Application Serial Number 200610054555.X, which was filed on Oct. 31, 2006, and is hereby incorporated by reference in its entirety.

What is claimed is:

1. A porous concrete road surface structure made from polymer modified cement, comprising: a bonding layer, a water permeable concrete layer and a surface treating layer, wherein the water permeable concrete layer is in the form of a single layer, wherein the bonding layer is above an existing bottom layer and the permeable concrete layer is above the bonding layer, and a top face of the permeable concrete layer is coated by the surface treating layer, the permeable concrete layer comprises discontinuously graded or single graded coarse aggregates and the permeable concrete layer contains approximately evenly distributed voids for water permeability, wherein the permeable concrete layer has a void ratio of 10-30%, and wherein the voids are not filled with a polymer.

2. The porous concrete road surface structure as claimed in claim 1, wherein the permeable concrete layer further comprises sand, cement, polymer and water, and the ingredients are mixed and bonded together with proportions in part by weight of cement: coarse aggregates: sand: polymer: water=150-400: 1200-2200: 0-500: 30-200: 0-120, to form the permeable concrete layer.

3. The porous concrete road surface structure as claimed in claim 2, wherein the particle size of the coarse aggregates in concrete is equal to or greater than 2.5 mm.

4. The porous concrete road surface structure as claimed in claim 2, wherein the polymer comprises at least one of a styrene butadiene rubber (SBR) emulsion, a neoprene emulsion, an acrylic acid emulsion, an acrylate emulsion, a styrene-acrylate emulsion, or a vinyl acetate-ethylene (VAE) emulsion.

5. The porous concrete road surface structure as claimed in claim 2, wherein the polymer comprises a mixture of two or more of a styrene butadiene rubber (SBR) emulsion, a neoprene emulsion, an acrylic acid emulsion, an acrylate emulsion, a styrene-acrylate emulsion, or a vinyl acetate-ethylene (VAE) emulsion.

6. The porous concrete road surface structure as claimed in claim 1, wherein the bonding layer is grout of polymer modified cement, or a grout mixture with proportions in part by weight of polymer:water: cement: sand=1:0-5:1-15:0-5.

7. The porous concrete road surface structure as claimed in claim 6, wherein the polymer is a polymer resin or a polymer rubber or a mixture of a polymer resin and a polymer rubber.

8. The porous concrete road surface structure as claimed in claim 6, wherein the polymer comprises at least one of a styrene butadiene rubber (SBR) emulsion, a neoprene emulsion, an acrylic acid emulsion, an acrylate emulsion, a styrene-acrylate emulsion, or a vinyl acetate-ethylene (VAE) emulsion.

9. The porous concrete road surface structure as claimed in claim 6, wherein the polymer comprises a mixture of two or more of a styrene butadiene rubber (SBR) emulsion, a neoprene emulsion, an acrylic acid emulsion, an acrylate emulsion, a styrene-acrylate emulsion, or a vinyl acetate-ethylene (VAE) emulsion.

10. The porous concrete road surface structure as claimed in claim 1, wherein the surface treating layer is polymer modified cement grout, or a groutmixture with proportions in part by weight of polymer:water:cement:sand=1:0-4:0-12:0-10.

11. The porous concrete road surface structure as claimed in claim 10, wherein the polymer is a polymer resin or a polymer rubber or a mixture of a polymer resin and a polymer rubber.

12. The porous concrete road surface structure as claimed in claim 10, wherein the polymer comprises at least one of a styrene butadiene rubber (SBR) emulsion, a neoprene emulsion, an acrylic acid emulsion, an acrylate emulsion, a styrene-acrylate emulsion, or a vinyl acetate-ethylene (VAE) emulsion.

13. The porous concrete road surface structure as claimed in claim 10, wherein the polymer comprises a mixture of two or more of a styrene butadiene rubber (SBR) emulsion, a neoprene emulsion, an acrylic acid emulsion, an acrylate emulsion, a styrene-acrylate emulsion, or a vinyl acetate-ethylene (VAE) emulsion.

14. The porous concrete road surface structure as claimed in claim 2, wherein the polymer is a polymer resin or a polymer rubber or a mixture of a polymer resin and a polymer rubber.

* * * * *